United States Patent [19]

Koenig et al.

[11] Patent Number: 4,912,382
[45] Date of Patent: Mar. 27, 1990

[54] FAIL SAFE MONITORING APPARATUS AND METHOD

[75] Inventors: David J. Koenig, Wyoming; Mark H. Schultz, Minneapolis, both of Minn.

[73] Assignee: Onan Corporation, Minneapolis, Minn.

[21] Appl. No.: 191,614

[22] Filed: May 9, 1988

[51] Int. Cl.⁴ .................................. G05B 9/02
[52] U.S. Cl. ................................... 318/563
[58] Field of Search ........................ 318/563

[56] References Cited

U.S. PATENT DOCUMENTS

| | | | |
|---|---|---|---|
| 3,068,460 | 12/1962 | Uhrig et al. | 340/660 |
| 3,324,541 | 2/1966 | Paull | 419/4 |
| 3,363,167 | 1/1968 | Szabo et al. | 322/8 |
| 3,536,979 | 10/1970 | Reuteler | 318/563 |
| 3,781,633 | 12/1973 | Iwaki et al. | 320/48 |
| 3,942,097 | 3/1976 | Itoh et al. | 322/28 |
| 3,964,044 | 6/1976 | Busco | 340/521 |
| 4,006,448 | 2/1977 | Arai et al. | 340/52 F |
| 4,041,369 | 8/1977 | King et al. | 322/99 |
| 4,078,750 | 3/1978 | Tomlinson | 318/563 X |
| 4,118,706 | 10/1978 | Lenihan | 340/524 |
| 4,245,185 | 1/1981 | Mitchell et al. | 323/235 |
| 4,387,368 | 6/1983 | Day, III et al. | 340/539 |
| 4,415,849 | 11/1983 | Sievers et al. | 322/99 |
| 4,477,753 | 10/1984 | Ratzel et al. | 318/563 |
| 4,484,119 | 11/1984 | Kerr | 318/563 |
| 4,491,828 | 1/1985 | Galvin et al. | 340/525 |
| 4,499,455 | 2/1985 | Leveille et al. | 340/531 |
| 4,513,239 | 4/1985 | Morishita et al. | 322/99 |
| 4,523,185 | 6/1985 | Roth | 340/524 |
| 4,535,321 | 8/1985 | Merz | 340/520 |

FOREIGN PATENT DOCUMENTS 0090758 10/1983 European Pat. Off. .
2585135 7/1985 France .

OTHER PUBLICATIONS

Onan Schematic, 1988.

Primary Examiner—William M. Shoop, Jr.
Assistant Examiner—Saul M. Bergmann
Attorney, Agent, or Firm—Merchant, Gould, Smith, Edell, Welter & Schmidt

[57] ABSTRACT

An apparatus for detecting and analyzing a fault condition occurring in an engine electrical generator set (21) while providing means for inhibiting the engine electrical generator set (21) upon the occurrence of the fault. The apparatus utilizes a run relay (22) connected in series with single contact fault senders (26) to a reference potential. The single contact fault senders (26) monitor various parameters of the engine electrical generator set (21). When a parameter is exceeded, the single contact fault sender (26) opens, de-energizing run relay (22) thereby inhibiting engine electrical generator set (21). Optical isolators (27) monitor the single contact fault senders (26) and provide information on their status to logic determining means (24) to alert an operator of an exceeded parameter. Also provided is a bypass switch (31) to bypass single contact fault senders (26).

9 Claims, 3 Drawing Sheets

FAIL SAFE MONITORING APPARATUS AND METHOD

FIELD OF THE INVENTION

This invention relates generally to the detection of faults in a process control system, and more particularly to an improved method and apparatus for detecting and analyzing a fault condition occurring in an engine-electrical generator set while providing means to shut down the engine.

BACKGROUND OF THE INVENTION

Fail safe fault monitoring systems are widely used in engine electric-generator set (gen-set) environments. The systems are used to monitor the status of several parameters of the engine in the gen-set. They may also be used to monitor the status of the electrical generator. In the event of the presence of an operating condition which will cause damage to the engine or generator, it is the system's responsibility to turn the gen-set system off, frequently called "shut down". The system typically does this by grounding the distributor wire in a gasoline powered gen-set and by shutting off the fuel supply in a diesel powered gen-set. Examples of the parameters which may be monitored are oil pressure, fuel supply, engine temperature, engine speed, and improper current or voltage conditions.

Good engineering practices, and often times government specifications, require in a fail safe circuit that all fault monitoring contacts be in series with a run relay for the gen-set. The run relay is connected such that if any one or more fault senders open ("trip"), the run relay will be de-energized and the gen-set will shut down. Typically, the gen-set system's parameters are monitored by electromechanical devices known as fault senders. These senders have two sets of contacts, and are often called double contact fault senders. The first contact is normally closed and completes the ground path for the run relay. As noted above, there are typically several fault senders in series in the run relay ground path. When a sender is tripped, it simultaneously closes its second set of contacts while opening the first set. The closing of the second set of contacts operates to complete a circuit, thereby lighting a fault lamp. The opening of the first set of contacts removes the ground potential from the run relay, thereby de-energizing it and shutting down the monitored process.

Double contact fault senders are relatively expensive and unreliable mechanical devices. In one prior art system, the double contact fault sender for sensing overheating is actuated by wax in an enclosed tube. As the wax heats, it changes state from a solid to a liquid. This change of state causes the wax to expand within the tube against a slideable plunger. The movement of the plunger activates a set of spring loaded contacts, completing a second set of contacts while opening a first. Such a mechanical analog system requires very close tolerances. It is also susceptible to temperature rise time lag, and is further susceptible to the static frictional force of the spring loaded contacts.

In generator set systems requiring the monitoring of numerous types of parameters for fault conditions, any reduction of the number, or complexity, of the discrete fault sender components can result in substantial cost reduction, system reliability and increased efficiency.

It is also desirable in a gen-set environment to electrically isolate the fault senders from the display or output devices. Typically, systems having double contact fault senders use warning lamps connected to the second set of contacts mechanically linked to those controlling the run relay. Use of that style of contact, therefore, introduced a mechanical element into the system.

As can be appreciated, the prior method of analyzing and providing for a fail safe monitoring system is characterized by complex senders. The present invention addresses the problems associated with a dual contact fault sender fail safe system by, among other things, using integrated circuits in connection with single contact fault senders. The system also uses an electrical optical isolator device to electrically isolate the monitoring system from the display output drives. The system also uses a readily available microprocessor which provides increased performance and a reduction in cost over the above described two contact system.

SUMMARY OF THE INVENTION

The present invention provides an improved fail safe monitoring system for monitoring a plurality of parameters, wherein monitoring devices are connected in series with a run relay. The monitoring device opens upon sensing a fault condition of the monitored parameter, thereby removing the ground potential from the run relay. The run relay then de-energizes which in turn inhibits the monitored system. Although a run relay is used in a preferred embodiment, any number of similar devices also might be used including a solenoid to close a fuel line, an air shut off or an ignition type switch.

In a preferred embodiment of a device constructed according to the principles of this invention, the device includes one or more single contact fault senders connected in series with one another, add in series with a run relay. The relay is operatively connected to the system to be monitored. Means for generating a voltage potential are connected across the series of fault senders and run relay. Corresponding optical isolators are connected to the voltage potential and the high point of each fault sender. The optical isolator senses for a reference/ground potential at each high side of the corresponding fault sender. Therefore, there is an optical isolator corresponding to each fault sender used in the monitoring system. There is also a current limiting resistor in series with each optical isolator for limiting the current through the optical isolator which is generated by the voltage generating source. Logic means, connected to the optical isolators and responsive to the inputs from the optical isolators, determine whether a fault condition has occurred.

Therefore, one feature of the present invention is the utilization of single contact fault senders which are able to both inhibit the gen-set system and provide a signal to the logic means for interpreting a fault. Use of single contact fault senders eliminates one set of contacts, as well as the mechanical element which typified prior art systems. Use of single contact fault senders also reduces the complexity and cost of the device, while increasing the reliability.

Another feature of the present invention is the use of electrical isolators for the input drives to the fault monitoring system. This allows the fail safe system to require less stringent regulation of the voltage supply powering the monitoring system and run relay. Further, the isolation protects the monitoring system from transient power abnormalities and voltage spikes which may be present in such systems. The term "optical isolator" as used in this application is meant to encompass a number of different isolator devices.

Still another feature of the present invention is an override switch which bypasses each of the fault senders. The bypass provides a parallel path to a reference/ground potential from the run relay. This feature allows use of the gen-set in those conditions when the importance of providing power generation exceeds the concern for maintenance of the gen-set itself. By bypassing he fault senders, even if a fault occurs, the run relay remains energized and the gen-set remains in its operative state.

A further aspect of the present invention is the use of logic means for determining the status of the several monitored parameters as reported by the single contact fault senders. Such logic means may include a microprocessor, digital logic gates or even analog circuitry.

One particular application for a preferred embodiment of the present invention, is its use in monitoring an electrical generator set system. Other uses of the invention described herein will be apparent to those skilled in the art.

Therefore, according to one aspect of the invention, there is provided a fail safe circuit for monitoring a plurality of parameters of a control process system comprising inhibit means, cooperatively connected to the control process system and capable of receiving an inhibit signal, for inhibiting the control process system upon receipt of said inhibit signal; switching means, connected to said inhibit means, for creating an inhibit signal responsive to the status of the parameters of the control process system; and logic determining means cooperatively connected to said switching means for detecting said inhibit signal and for determining which parameter of the control process system was responsible for said inhibit signal.

According to another aspect of the invention, there is provided a method of monitoring a plurality of parameters of a control process system in accordance with particular set values and inhibiting the control process system when any one parameter exceeds its corresponding set value by de-energizing a relay switch connected to the control process system comprising the steps of monitoring the control system parameter; creating an inhibit signal responsive to the status of the parameters of the control process system; inhibiting the control process system upon receipt of said inhibit signal; and determining which parameter of the control process system was responsible for creating said inhibit signal.

These and other advantages and features which characterize the present invention are pointed out with particularity in the claims annexed hereto and forming a further part hereto. However, for a better understanding of the invention, its advantages and objects attained by its use, reference should be made to the Drawing which form a further part hereof, and to the accompanying descriptive matter, in which there is illustrated add described a preferred embodiment of the present invention.

BRIEF DESCRIPTION OF THE DRAWING

In the Drawing wherein like reference numerals and letters indicate corresponding elements throughout the several views.

DETAILED DESCRIPTION OF THE PREFERRED EMBODIMENT

The principles of this invention apply to the monitoring of parameters in a process control system and include a method to inhibit the process in the event that a monitored parameter exceeds a preset condition. A preferred application for this invention is in the monitoring of parameters of an engine and electrical generator set. Such application is typical of only one of innumerable types of applications in which the principles of the present invention can be employed.

Figure 1:
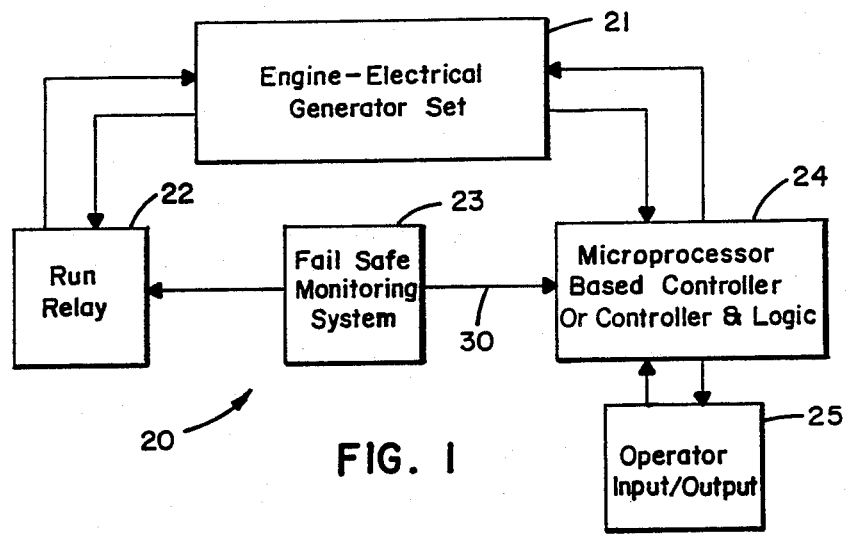
FIG. 1 is a block diagram illustrating a system wherein a device constructed according to the principles of the present may be utilized.

Referring now to the Figures, there is illustrated preferred embodiments of a fail safe monitoring system configured in accordance with the principles of the present invention. The engine and electrical-generator set (gen-set) and its peripheral components are generally referred to by the reference numeral 20. The system is illustrated in FIG. 1 as including a gen-set 21, run relay 22, a fail safe monitoring system 23, a microprocessor based controller 24 (or other logic means) and an operator input/output device 25. The controller 24 is typically used to control the generator in closed loop fashion. The controller 24 may receive input from an operator and display the condition of the gen-set 21, including faults as generally illustrated by the functional block 25. Typically input and output includes a keyboard and a cathode ray tube (not shown) although switches, gauges and lamps (not shown) may also be used. Controller 24, in addition to including its input and output from gen-set 21 and the operator input/output 25, is further illustrated as including an input from the fail safe monitoring system 23 from signal flow path 30. Controller 24 may monitor the speed of the engine of gen-set 21 to control the generator output waveform frequency and may control the field windings of the generator of the gen-set 21 to control the output voltage of the gen-set 21. Controller 24 may also be analog based as is well known by those skilled in the art.

Figure 2:
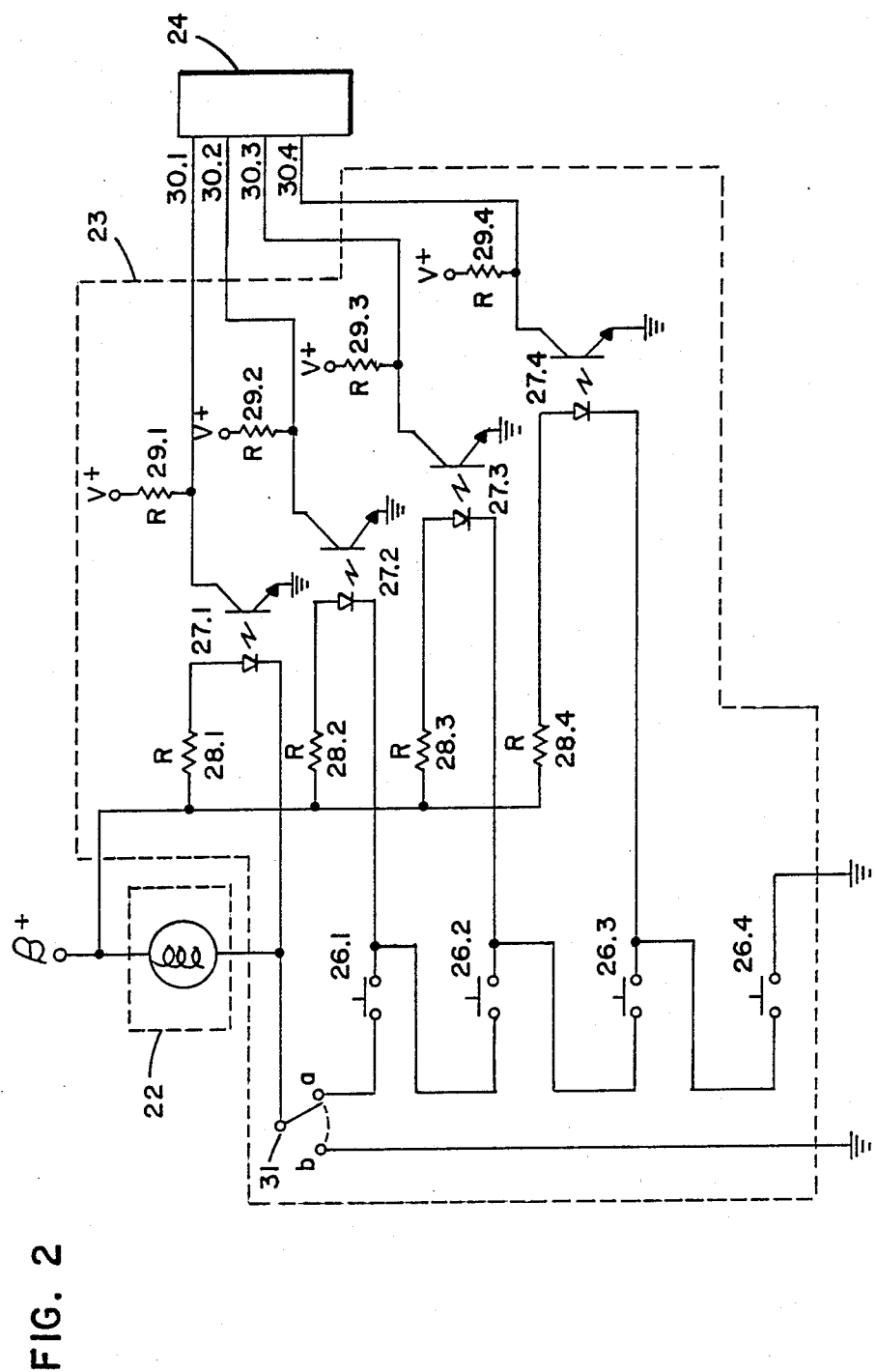
FIG. 2 is a schematic diagram o a preferred circuit configuration of the fail safe monitoring block illustrated in FIG. 1.

FIG. 2 sets forth a schematic diagram of a preferred embodiment of the fail safe monitoring system 23 in which a run relay 22 is responsible for creating a closed circuit to a gen-set 1 to maintain gen-set 21 in its operative state. Connected in series with run relay 22 to a ground potential/reference level (hereafter referred to as "ground" for convenience), are a series of single contact fault senders designated as 26.1, 26.2, 26.3 and 26.4. Although fault senders 26 are shown in series with run relay 22 between run relay 22 and ground, fault senders 26 could also be connected in series between run relay 22 and positive voltage potential B+ or a combination of the two. Fault senders 26 are normally closed when no fault condition occurs. This normally closed position provides run relay 22 with a path to ground. Optical isolators 27.1, 27.2, 27.3 and 27.4 are connected to the positive voltage potential B+ through current limiting resistors 28.1, 28.2, 28.3 and 28.4 respectively.

Each optical isolator 27 may be represented by a light emitting diode (LED) and phototransistor which are electrically isolated from each other. The LEDs are connected with their anodes to the current limiting resistors 28 and their cathodes to the high point of the corresponding single contact fault sender 26. Therefore, by way of example, the cathode of the LED corresponding to optical isolator 27.1 i connected to the high point of fault sender 26.1, the cathode of the LED corresponding to optical isolator 27.2 is connected to the high point of fault sender 26.2 and so on.

When a LED 27 is forward biased, the diode emits light. This light is received by the corresponding NPN phototransistor. The transistors are connected with their emitters coupled to ground and collectors connected to a voltage source V+through pull up resistors 29. The collectors act as an input drive to the logic means, or, in the preferred embodiment, controller 24. Therefore, when the LEDs are forward biased, the transistors are turned on, in the well known transistor type manner, and the voltage at the transistor's collector is low, corresponding to a logical zero in a positive logic scheme. On the other hand, when the voltage across the LED is less than the amount required to forward bias the diode, no light is emitted thereby turning the transistor off. In this instance, the voltage at the transistor's collector then goes high corresponding to a logical one in a positive logic scheme.

In the preferred embodiment, a rapid restart valve of the type manufactured by Cummins Engine Co., designated by the number 301-7993 with a 24-volt coil, is used as the run relay 22. The optically-coupled isolator used is designated as a MCT6 manufactured by Optoelectronic Products. It should be well understood by those skilled in the art that the values of the voltage sources B+and V+and the various component values and selection are interdependent upon one another. Further, it should be well understood that although in the preferred embodiment positive logic is used, that negative logic could also be used.

Figure 4:
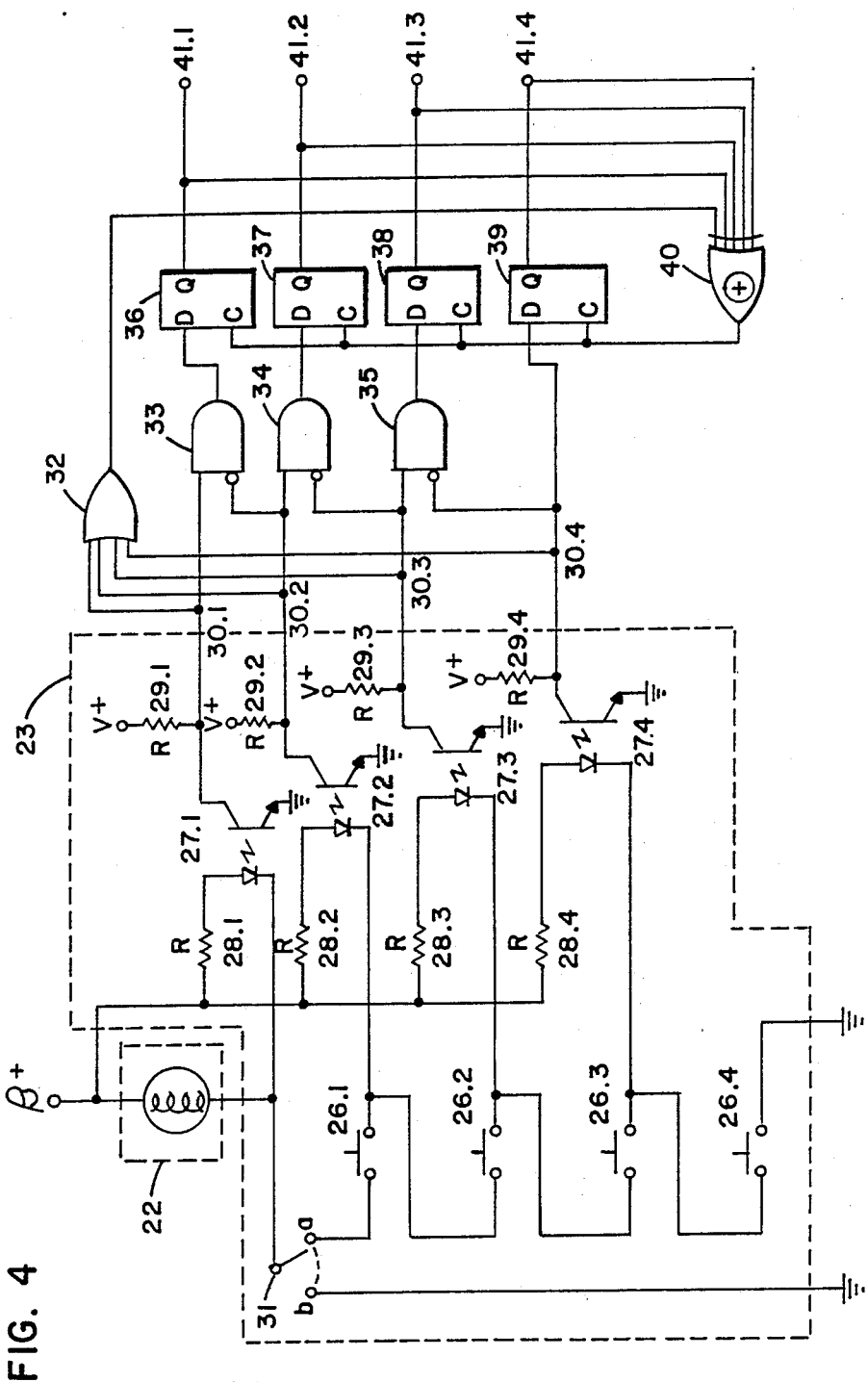
FIG. 4 is a schematic diagram of an alternative embodiment of the circuit illustrated in FIG. 2.

While not specifically detailed in FIGS. 2 and 4, it will be understood that the various logic gates, flip flops, and microprocessors are to be properly connected to appropriate bias and reference supplies so as to operate in their intended manner. Similarly, it will be understood that appropriate memory, buffer and other attendant peripheral devices are to be properly connected to microprocessor based controller 24 so a to operate in its intended manner. In the preferred embodiment of the present invention, microprocessor based controller is an 8097 microcontroller chip manufactured by Intel as a part of its 8096 family of controller chips. A more thorough discussion of the 8097 microcontroller chip may be found in Intel, *Embedded Controller Handbook*, (1988, ©1987), which is hereby incorporated by reference.

In operation, run relay 22 is connected to the voltage potential means B+. This energizes the relay 22 thereby allowing the connected gen-set 21 to become operational from its inhibited state. Simultaneously, optical isolators 27.1, 27.2, 27.3 and 27.4 are turned on such that output drives 30 go to a low voltage level. The logic means 24 interprets the low voltage level as the lack of a fault occurrence. Each of the fault senders 26 must be in its normally closed position for the gen-set 21 to be in this operational state. Upon the occurrence of a fault, the corresponding single contact fault sender opens, removing the ground potential from run relay 22. The run relay de-energizes placing gen-set 21 in an inhibited state. At the same time, the LED of optical isolator 27 connected to the high point of the fault sender 26 which opened loses its forward based state since the ground potential is removed. When a LED turns off, the associated photosensitive transistor turns off. Upon the occurrence of the transistor turning off, the associated output drive 30 goes to a high voltage level. The logic means for the monitoring system interprets this high voltage state as a fault at the appropriate fault sender switch.

As noted above, run relay 22 typically inhibits gen-set 21 by grounding the distributor wire in a gasoline powered gen-set 21 or by shutting off the fuel supply in a diesel powered gen-set 21.

In one embodiment of a device constructed according to the principles of the present invention, a single contact fault sender used is of the snap-action type. This type of sender has a metal contact which is normally slightly concave, but when heated the metal expands and moves o a convex shape. This allows the device to act as a switch. By placing a stationary contact appropriately, the device will present an open switch when heated to a desired point and closed when not heated sufficiently. Using this type of single contact fault senders 26 in series with one another and the run relay 22 to ground, any one of the fault senders 26 will shut down the gen-set 21 upon achieving the desired temperature. Other types of single contact fault senders will be apparent to those skilled in the art, and the snap-action type is presented by way of illustration only.

More specifically in operation, assume that single contact fault sender 26.2 is of the type described above. In the event of an overheating condition and sender 26.2 opens, then optical isolators 27.1 and 27.2 turn off driving lines 30.1 and 30.2 high. However, by polling the input lines 30 in sequence in numerically descending order, the logic means, here controller 24, will determine the fault sender 26 which opened due to a fault condition.

Figure 3:
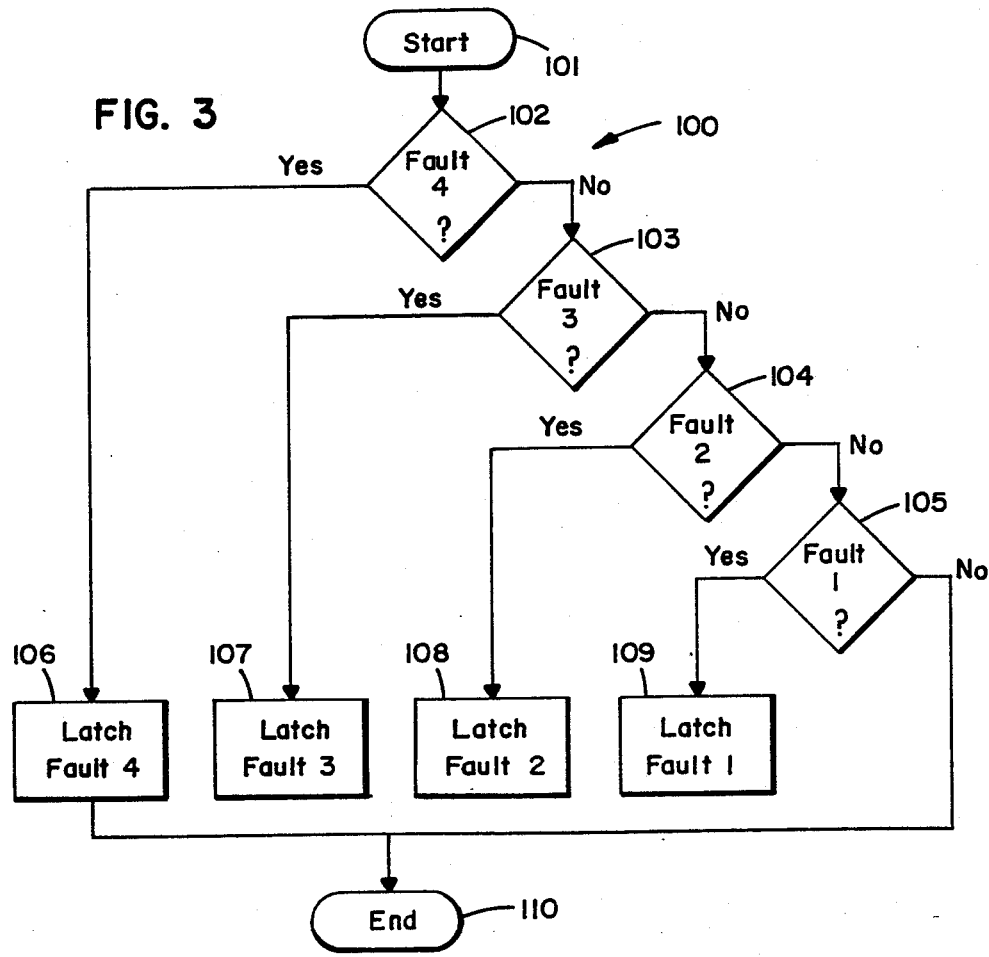
FIG. 3 is a logic block diagram illustrating computer program operation of block 24 in FIG. 2.

In a preferred embodiment of a device constructed according to the principles of the present invention, the logic means consists of a microprocessor 24 which sequentially polls the output drives 30 of the optical isolator's 27 transistors. The logic flow diagram of an embodiment of the program logic which might be resident in microprocessor is illustrated in FIG. 3, wherein the logic diagram is shown generally at 100. The logic flow diagram 100 illustrates the steps taken to analyze the logical status of the optical isolator 27 output drive 30.

Although the controller 24 will be characterized as "proceeding" from logical block to logical block, while describing the operation of the program logic, those skilled in the art will appreciate that programming steps are being acted on by microprocessor 24.

In operation, controller 24 starts at block 101. Controller 24 then proceeds to poll the output drive 30.4 of optical isolator 27.4 at block 102 of logic flow diagram 100. In the event that the output drive is at a high level or a logical "one" (i.e., turned off due to fault sender 26.4 being open), the controller 24 proceeds to block 106 in order to latch that fault which corresponds to the process parameter which has been exceeded. However, in the event that the output drive 30.4 is still at a low level or logical "zero" (i.e., turned on due to fault sender 26.4 being closed), then controller 24 continues to block 103 to poll the output drive 30.3 of optical isolator 27.3.

The controller 24 then continues by polling output drive 30.3 in a manner similar to block 201: continuing to block 104 if the output drive 30.3 is "zero" or proceeding to block 107 to latch the fault if the output drive 30.3 is a "one". Again at bloc 104, controller 24 polls the output drive 30.2 of optical isolator 27.2, continuing to block 105 if the drive is a "zero" and to block 108 if the drive is "one". Finally, at 105, controller 24 polls the output drive 3011, continuing to block 109 to latch the fault in the event of a "one" and continuing to block 110 to end the process if no faults have been encountered. If any faults have been latched at blocks 106, 107, 108 or 109, controller 24 continues to block 110 to end.

This software logic routine may be interrupt driven or may be part of a main program. Once the faults are latched, preferably, controller 24 provides an indication via operation input/output 25 as to the cause of the gen-set 21 going into its inhibited state. Controller 24 may also provide that the gen-set 21 does not return to its operational state should the fault condition be removed (i.e., cooling down once inhibited after overheating) during the period after gen-set 21 is inhibited. Preferably, the opportunity for an operator to examine the cause of the fault condition occurs allowing for the operator to reset the system status.

Referring to FIG. 2, bypass switch 31 is illustrated as having two positions "a" and "b". The switch 31 provides for overriding the fail safe monitoring system 23 function. Switch 31 has a first position a, wherein the run relay 22 ground path is through fault senders 26. By placing switch 31 into its second position b, it provides for a direct uninterruptable path from run relay 22 to ground. In effect, switch 31 in its b position bypasses each of the single contact fault senders 26. This switch allows the use of the gen-set 21 without the gen-set 21 going to an inhibited state during those circumstances when the importance of providing power generation exceeds the concern for the maintenance and operating condition of the gen-set 21 itself. When switch 31 is set to its b position, an opening of a fault sender 26 will not deenergize run relay 22. Although, logic means 24 will still interpret all faults except that provided by fault sender 26.1, and will interpret all faults if the first optical isolator 27.1 is not tied directly to the run relay.

Alternative Embodiment

In FIG. 4, there is illustrated an alternative embodiment to the present invention. The fail safe monitoring system 23 remains the same, as discussed in connection with FIG. 2 above. Also, the embodiment may be provided with a by-pass switch 31 as illustrated in FIG. 4. However, instead of output drives 30 being connected to controller 24, they are connected to a logic means constructed of an OR gate 32; AND gates 33, 34 an 35; D flip flops 36, 37, 38 and 39; and an Exclusive OR gate 40. Each of the output drives 30 are connected to OR gate 32 whose output is connected to the input of Exclusive OR gate 40. Output drive 30.1 is connected to AND gate 33 along with the inverted signal provided by output drive 30.2. AND gate 34 is connected to output drive 30.2 and the inverted signal provided by output drive 30.3. AND gate 35 is connected to output drive 30.3 and the inverted signal provided by output drive 30.4. The output of AND gate 33 is provided to the data input of D flip flop 36, the output of AND gate 34 is provided to the data input of D flip flop 37, and the output of AND gate 35 is provided to the data input of D flip flop 38. Output drive 30.4 is connected directly to the data input of D flip flop 39. The output (Q) of D flip flop 36 is connected to Exclusive OR gate 40 and also serves as an output line corresponding to fault sender 26.1 at point 41.1. The output Q of D flip flop 37 is provided to Exclusive OR gate 40 and corresponds to fault sender 26.2 at point 41.2. The output Q of D flip flop 38 is also provided to Exclusive OR gate 40 and corresponds to fault sender 26.3 at point 41.3. Finally, the Q output of D flip flop 39 is also provided as an input to the Exclusive OR gate 40 and corresponds to fault sender 26.4 at point 41.4. The output of Exclusive OR gate 40 is connected as the clock (C) input of D flip flops 36, 37, 38 and 39.

In operation, with each of the fault senders 26 closed, drive outputs 30 are at a low state or logical zero. With all inputs zero, OR gate 32 provides an output of zero to Exclusive OR gate 40. Each of the AND gates 33, 34, and 35 have an output of zero since each has an input of a zero and a one (due to being inverted). Therefore, the inputs to each of the D flip flops 36, 37, 38 and 39 are zeros and so the outputs 41 are also zeros. Since each of the outputs 41 are zero, Exclusive OR gate provides no clock pulse signal to D flip flops 36, 3, 38 and 39.

Extending the example described above for the preferred embodiment, wherein fault sender 26.2 opens, and drive outputs 30.1 and 30.2 go high, the logic means of the alternative embodiment will decode the fault as follows: OR gate 32 will go high (i.e., logical one) since two of its inputs are logical ones (i.e., output drives 30.1 and 30.2) and drive outputs 303 and 30.4 are zeros. AND gate 33 will remain low since output drive 30.1 has gone high and the inverted signal of output drive 30.2 is low. Therefore, AND gate 33 will see a zero and a one as inputs and therefore will still provide a zero to D flip flop 36. AND gate 34, on the other hand, will go high since output drive 30.2 is high and 30.3, which is low, is inverted high. Therefore AND gate 34 provides a logical one t D flip flop 37. AND gate 35 will remain low since output drive 30.3 remains low. Therefore AND gate 35 will provide a logical zero to D flip flop 38. D flip flop 39 similarly receives a logical zero input directly from output drive 30.4.

Exclusive OR gate 40 is provided with a logical one from OR gate 32. Acting in the well known Exclusive OR manner, Exclusive OR gate 40 then provides a clock pulse (a logical one) to the clock input C of D flip flops 36, 37, 38 and 39. Each of the D flip flops, then acting in the well known D flip flop manner, store the logical one or logical zero state transmitted to its data (D) input. In the present example, D flip flops 36, 38 and 39 store a logical zero, while D flip flop 37 stores a logical one. The output of D flip flop 37 is therefore a logical one at 41.2 while D flip flops 36, 38 and 39 provide logical zeros at the respective output points 41. Since a second logical one is provided to Exclusive OR gate 40, its output provided to the clock inputs of D flip flops 36, 37, 38 and 39 again goes to zero thereby latching the output fault. Fault condition points 41 can easily be used to drive lamps or provide other means to an operator to signal a fault condition as is well known in the art.

The above described logic means may take on any number of configurations and operational characteristics and are well known in the industry. It is to be understood that even though numerous characteristics and advantages of the present invention have been set forth in the foregoing description, together with details of the structure and function of the invention, the disclosure is illustrative only and changes may be made in detail, especially in matters of the isolation means and their operation, the run relay, voltage generating means, and the fault sender utilized. Further, although four fault

What is claimed is:

1. A fail safe circuit for monitoring a plurality of parameters of a control process system comprising:
   (a) inhibit means, cooperatively connected to the control process system and capable of receiving an inhibit signal, for inhibiting the control process system upon receipt of said inhibit signal;
   (b) switching means, operatively connected to said inhibit means and control process system for creating an inhibit signal responsive to the status of the parameters of the control process system; and
   (c) isolation means, connected to said switching means, for electrically isolating said switching means and providing an output drive corresponding to each monitored parameter; and
   (d) logic determining means, cooperatively connected to said isolation mans whereby said logic determining means are electrically isolated from said switching means, for detecting said inhibit signal and for determining which parameter of the control process system was responsible for said inhibit signal comprising:
      (i) fault memory means for storing information regarding a fault condition;
      (ii) data processing means including:
         (A) means for polling each output drive to determine whether a fault condition has occurred;
         (B) means for latching a fault condition associated with said output drive; and
         (C) means for storing the fault condition in said fault memory means.

2. A fail safe circuit for monitoring a plurality of parameters of a control process system in accordance with particular set values and for inhibiting the control process system when any one parameter exceeds its corresponding set value by de-energizing a relay switch connected to the control process system, the fail safe circuit comprising:
   (a) switching means connected to the control process system for monitoring the status of the parameters and for creating an inhibit signal responsive to the parameter status;
   (b) isolation means, connected to said switching means, for electrically isolating said switching means, said isolation means include output drives corresponding to the parameters of the control process system;
   logic determining means, cooperatively connected to said isolation means whereby said logic determining means are electrically isolated from said switching means and wherein said inhibit signal is provided to said logic determining means by said isolation means, for detecting said inhibit signal and for determining which parameter of the control process system was responsible for said switching means creating said inhibit signal, wherein said logic determining means are connected to said output drives and includes:
      (i) fault latch memory means for storing faults;
      (ii) data processing means including:
         (A) means for polling said output drives to determine whether a fault condition as occurred;
         (B) means for latching a fault condition; and
         (C) means for storing said fault condition in said fault latching memory means.

3. A fail. safe circuit for monitoring a plurality of parameters of a control process system in accordance with particular set values and for inhibiting the control process system when any one parameter exceeds its corresponding set value by de-energizing a relay switch connected to the control process system, the fail safe circuit comprising:
   (a) switching means connected to the control process system for monitoring the status of the parameters and for creating an inhibit signal responsive to the parameter's status;
   (b) logic determining means for detecting said inhibit signal and for determining which parameter of the control process system was responsible for said switching means creating said inhibit signal;
   (c) isolation means, cooperatively connected to said switching means and said logic determining means, for electrically isolating said switching means from said logic determining means and for providing said inhibit signal to said logic determining means; and
   (d) by-pass means connected to the relay switch for disabling receipt of said inhibit signal, whereby the relay switch does not receive said inhibit signal despite said switching means generation of said inhibit signal.

4. A fail safe circuit for monitoring a plurality of parameters of a control process system in accordance with particular set value and for inhibiting the control process system when any one parameter exceeds its corresponding set value by de-energizing a relay switch connected to the control process system, the fail safe circuit comprising:
   (a) switching means connected to the control process system for monitoring the status of the parameters and for creating an inhibit signal responsive to the parameter's status;
   (b) isolation means connected to said switching means and said logic determining means for electrically isolating said switching means from said logic means and for providing said inhibit signal to said logic determining means; and
   (c) logic determining means for detecting said inhibit signal and for determining which parameter of the control process system was responsible for said switching means creating said inhibit signal, wherein said logic determining means includes:
      (i) detection means connected to said output drives for creating a detected output signal responsive to an inhibit signal;
      (ii) determining means connected to said output drives for creating control signals corresponding to parameters of the control process system; and
      (iii) latching means connected to said determining means for latching said control signals upon receipt of a clock pulse and for generating a latched value signal indicative of said latched control signal.

5. A fail safe circuit for monitoring a plurality of parameters of a control process system comprising:
   (a) a voltage source for producing a voltage;
   (b) inhibit means, cooperatively connected to the control process system and energized by said voltage source, for inhibiting the control process system upon the voltage being interrupted;
   (c) switching means, operatively connected to said inhibit means and the control process system, for selectively interrupting the voltage responsive to the status of the parameters of the control process system, whereby said inhibit means are directly energized when said switching means are closed and are directly de-energized when said switching means are open; and (d) isolation means, connected to said switching means, for electrically isolating said switching means and providing an output drive corresponding to each monitored parameter; and (e) logic determining means, cooperatively connected to said isolation means whereby said logic determining means are electrically isolated from said switching means, for detecting said interrupted voltage and for determining which parameter of the control process system was responsible for interrupting the voltage, comprising:

(i) fault memory means for storing information regarding a fault condition;

(ii) data processing means including:

(A) means for polling each output drive to determine whether a fault condition has occurred;

(B) means for latching a fault condition associated with said output drive; and (C) means for storing the fault condition in said fault memory means.

6. A fail safe circuit for monitoring a plurality of parameters of a control process system comprising:

(a) a voltage source for producing a voltage;

(b) inhibit means, cooperatively connected to the control process system and energized by said voltage source, for inhibiting the control process system upon the voltage being interrupted;

(c) switching means, operatively connected to said inhibit means and the control process system, for selectively interrupting the voltage responsive to the status of the parameters of the control process system, whereby said inhibit means are directly energized when said switching means are closed and are directly de-energized when said switching means are opened;

(d) isolation means, connected to said switching means, for electrically isolating said switching means;

(e) bypass means, connected to said inhibit means, for providing a parallel path for energizing said inhibit means, whereby said inhibit means remain energized despite said switching means selectively interrupting the voltage; and (f) logic determining means, cooperatively connected to said isolation means, whereby said logic determining means are electrically isolated from said switching means, for detecting said interrupted voltage and for determining which parameter of the control process system was responsible for interrupting the voltage.

7. A fail safe circuit for monitoring a plurality of parameters of a control process system in accordance with particular set values and for inhibiting the control process system when any one parameter exceeds its corresponding set value by de-energizing a relay switch connected to the control process system, the fail safe circuit comprising:

(a) switching means, connected in series with the relay switch and operatively connected to the control process system for monitoring the status of the parameters and for creating an inhibit signal responsive to the status of the parameters, said inhibit signal created by opening a set of electrical contacts, and wherein said inhibit signal directly de-energizes the relay switch;

(b) isolation means, connected to said switching means, for electrically isolating said switching means, said isolation means include output drives corresponding to the parameters of the control process system;

(c) logic determining means, cooperatively connected to said isolation means whereby said logic determining means are electrically isolated from said switching means and wherein said inhibit signal is provided to said logic determining means by said isolation means, for detecting said inhibit signal and for determining which parameter of the control process system was responsible for said switching means creating said inhibit signal, wherein said logic determining means are connected to said output drives and includes:

(i) fault latch memory means for storing faults;

(ii) data processing means including:

(A) means for polling said output drives to determine whether a fault condition as occurred;

(B) means for latching a fault condition; and (C) means for storing said fault condition in said fault latching memory means.

8. A fail safe circuit for monitoring a plurality of parameters of a control process system in accordance with particular set values and for inhibiting the control process system when any one parameter exceeds its corresponding set value by de-energizing a relay switch connected to the control process system, the fail safe circuit comprising:

(a) switching means, connected in series with the relay switch and operatively connected to the control process system, for monitoring the status of the parameters and for creating an inhibit signal responsive to the status of the parameter, said inhibit signal created by opening a set of electrical contacts, and wherein said inhibit signal directly inhibits the relay switch;

(b) logic determining means for detecting said inhibit signal and for determining which parameter of the control process system was responsible for said switching means creating said inhibit signal;

(c) isolation means, cooperatively connected to said switching means and said logic determining means, for electrically isolating said switching means from said logic determining means and for providing said inhibit signal to said logic determining means; and (d) by-pass means, connected to the relay switch, for disabling receipt of said inhibit signal, whereby the relay switch remains energized despite said switching means generation of said inhibit signal.

9. A fail safe circuit for monitoring a plurality of parameters of a control process system in accordance with particular set values for inhibiting the control process system when any one parameter exceeds its corresponding set value by de-energizing a relay switch connected to the control process system, the fail safe circuit comprising:

(a) switching means, connected in series with the relay switch and operatively connected to the control process system for monitoring the status of the parameters and for creating an inhibit signal responsive to the status of the parameters, said inhibit signal created by opening a set of electrical contacts, and wherein said inhibit signal directly de-energizes the relay switch;
(b) isolation means connected to said switching means and said logic determining means for electrically isolating said switching means from said logic means and for providing said inhibit signal to said logic determining means; and
(c) logic determining means for detecting said inhibit signal and for determining which parameter of the control process system was responsible for said switching means creating said inhibit signal, wherein said logic determining means includes:

(i) detection means connected to said output drives for creating a detected output signal responsive to an inhibit signal;
(ii) determining means connected to said output drives for creating control signals corresponding to parameters of the control process system; and
(iii) latching means connected to said determining means for latching said control signals upon receipt of a clock pulse and for generating a latched value signal indicative of said latched control signal.

* * * * *

UNITED STATES PATENT AND TRADEMARK OFFICE
CERTIFICATE OF CORRECTION

PATENT NO. : 4,912,382

DATED : March 27, 1990

INVENTOR(S) : DAVID J. KOENIG et al.

It is certified that error appears in the above-identified patent and that said Letters Patent is hereby corrected as shown below:

```
Column 2, line 35, for "add" read --and--.
Column 3, line 10, for "he" read --the--.
Column 3, line 59, for "add" read --and--.
Column 4, line 1, for "o" read --of--.
Column 5, line 5, for "i" read --is--.
Column 5, line 45, for "a" read --as--.
Column 7, line 1, for "bloc" read --block--.
Column 7, line 5, for "3011" read --30.1--.
Column 7, line 50, for "an" (second occurrence) read --and--.
Column 8, line 19, for "3," read --37,--.
Column 8, line 26, for "303" read --30.3--.
Column 8, line 34, for "t" read --to--.
Column 9, line 22, for "mans" read --means--.
Column 9, line 53, insert --(c)-- before "logic".
Column 10, line 31, for "value" read --values--.
Column 12, line 58, insert --and-- before "for".
```

Signed and Sealed this

Sixteenth Day of July, 1991

Attest:

HARRY F. MANBECK, JR.

Attesting Officer     Commissioner of Patents and Trademarks